United States Patent [19]
Simser

[11] Patent Number: 5,686,704
[45] Date of Patent: Nov. 11, 1997

[54] TARE COMPENSATING TANK WEIGHING DEVICE

[76] Inventor: Daniel C. Simser, 9 Shanel Pl., Nepean, Ontario, Canada, K2J 1C3

[21] Appl. No.: 446,461

[22] Filed: May 22, 1995

[51] Int. Cl.$^6$ ............................. G01G 23/14; G01G 3/00; G01G 3/02
[52] U.S. Cl. ......................... 177/167; 177/225; 177/233
[58] Field of Search .................... 177/225, 226, 177/228, 230, 231, 233, 167

[56] References Cited

U.S. PATENT DOCUMENTS

| | | | |
|---|---|---|---|
| 3,107,745 | 10/1963 | Bujan | 177/225 |
| 3,223,189 | 12/1965 | Robbins | 177/225 |
| 3,229,780 | 1/1966 | Hanssen | 177/225 |
| 3,743,042 | 7/1973 | Hilterhaus | 177/233 |
| 4,078,625 | 3/1978 | Loeb | 177/233 |
| 4,413,515 | 11/1983 | Quinn | 177/225 X |
| 4,765,420 | 8/1988 | Mengo | 177/233 X |
| 4,964,479 | 10/1990 | Sumida | 177/233 |
| 5,319,162 | 6/1994 | Ness | 177/231 X |
| 5,576,521 | 11/1996 | Dubach | 177/233 |

*Primary Examiner*—Michael L. Gellner
*Assistant Examiner*—Randy W. Gibson

[57] ABSTRACT

A weighing device for indicating a weight of a tank and compensating for the empty tank weight. The inventive device includes a weight indicating assembly for suspending a tank and indicating a gross weight thereof. A calibration assembly is coupled to the weight indicating assembly and can be adjusted in accordance with an empty weight of the tank to indicate a net weight of the contents thereof.

3 Claims, 3 Drawing Sheets

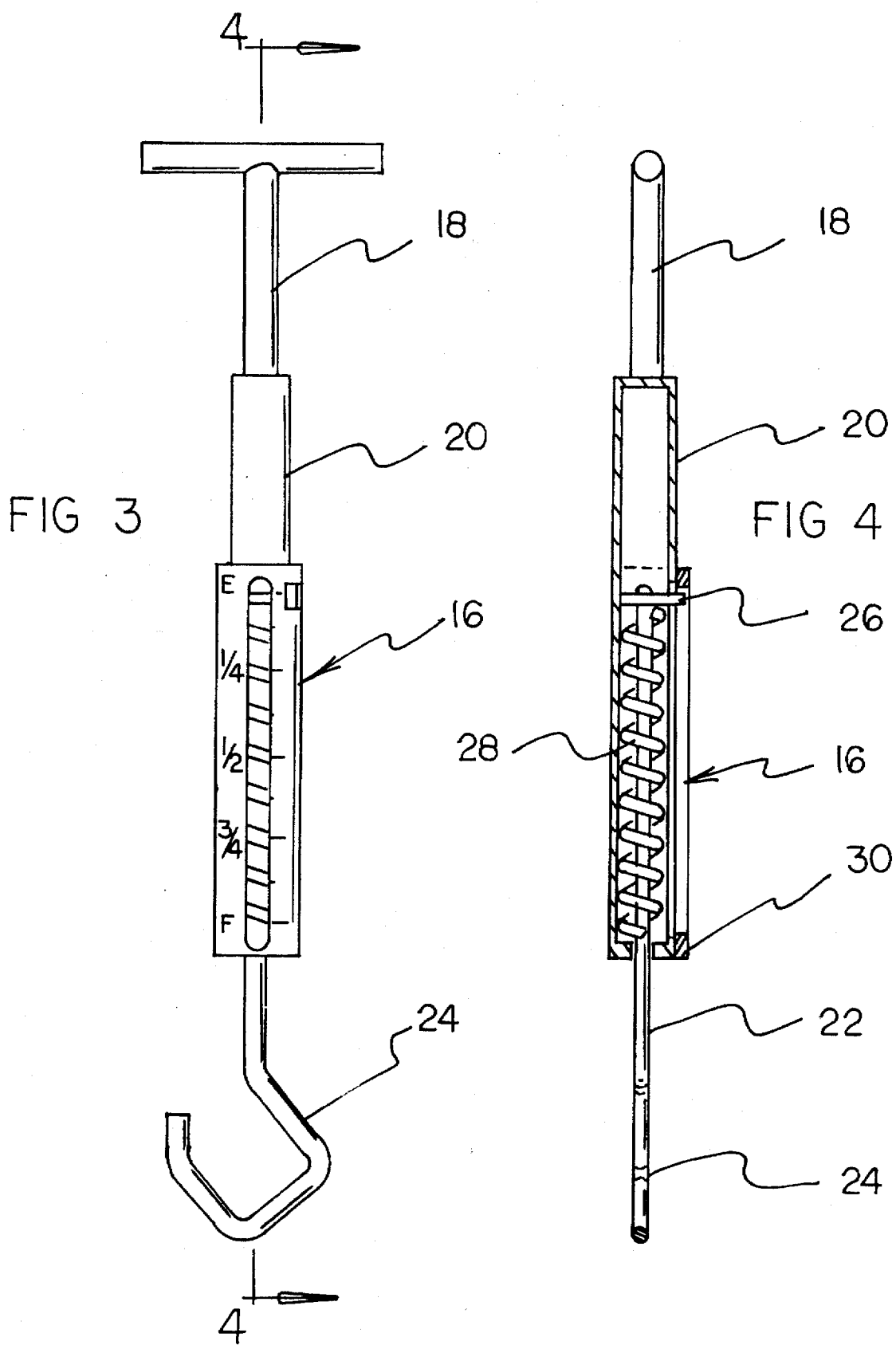

5,686,704

TARE COMPENSATING TANK WEIGHING DEVICE

BACKGROUND OF THE INVENTION

1. Related Data

The present application has been registered under the document disclosure program. The document disclosure request was received at the Patent Office on Aug. 1, 1994 and was designated the registration number 358,750.

2. Field of the Invention

The present invention relates to scale structures and more particularly pertains to an tare compensating tank weighing device for indicating a weight of a tank and compensating for the empty tank weight.

3. Description of the Prior Art

The use of scale structures is known in the prior art. More specifically, scale structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art scale structures include U.S. Pat. No. 4,524,617; U.S. Pat. No. 3,743,042; U.S. Pat. No. 4,785,897; U.S. Pat. No. 67,482; U.S. Pat. No. 3,718,198; U.S. Pat. No. 4,964,479; U.S. Pat. No. 3,503,462; and U.S. Pat. No. 3,687,209.

While these devices fulfill their respective, particular objectives and requirements, the aforementioned patents do not disclose a tare compensating tank weighing device for indicating a weight of a tank and compensating for the define empty tank weight which includes a weight indicating means for suspending a tank and indicating a gross weight thereof, and a calibration means coupled to the weight indicating means which can be adjusted in accordance with an empty weight of the tank for indicating a net weight of the contents thereof.

In these respects, the tare compensating tank weighing device according to the present invention substantially departs from the conventional concepts and designs of the prior art, and in so doing provides an apparatus primarily developed for the purpose of indicating a weight of a tank and compensating for empty tank weight.

SUMMARY OF THE INVENTION

In view of the foregoing disadvantages inherent in the known types of scale structures now present in the prior art, the present invention provides a new tare compensating tank weighing device construction wherein the same can be utilized to indicate a net weight of contents within a tank. As such, the general purpose of the present invention, which will be described subsequently in greater detail, is to provide a new tare compensating tank weighing device apparatus and method which has many of the advantages of the scale structures mentioned heretofore and many novel features that result in a tare compensating tank weighing device which is not anticipated, rendered obvious, suggested, or even implied by any of the prior art s, either alone or in any combination thereof.

To attain this, the present invention generally comprises a weighing device for indicating a weight of a tank and compensating for the empty tank weight. The inventive device includes a weight indicating assembly for suspending a tank and indicating a gross weight thereof. A calibration assembly is coupled to the weight indicating assembly and can be adjusted in accordance with an empty weight of the tank to indicate a net weight of the contents thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tare compensating tank weighing device apparatus and method which has many of the advantages of the scale structures mentioned heretofore and many novel features that result in a tare compensating tank weighing device which is not anticipated, rendered obvious, suggested, or even implied by any of the prior art s, either alone or in any combination thereof.

It is another object of the present invention to provide a new tare compensating tank weighing device which may be easily and efficiently manufactured and marketed.

It is a further object of the present invention to provide a new tare compensating tank weighing device which is of a durable and reliable construction.

An even further object of the present invention is to provide a new tare compensating tank weighing device which is susceptible of a low cost of manufacture with regard to both materials and labor, and which accordingly is then susceptible of low prices of sale to the consuming public, thereby making such tare compensating tank weighing devices economically available to the buying public.

Still yet another object of the present invention is to provide a new tare compensating tank weighing device which provides in the apparatuses and methods of the prior art some of the advantages thereof, while simultaneously overcoming some of the disadvantages normally associated therewith.

Still another object of the present invention is to provide a new tare compensating tank weighing device for indicating a weight of a tank and compensating for the empty tank weight.

Yet another object of the present invention is to provide a new tare compensating tank weighing device which includes a weight indicating means for suspending a tank and indicating a gross weight thereof, and a calibration means coupled to the weight indicating means which can be adjusted in accordance with an empty weight of the tank for indicating a net weight of the contents thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view thereof.

FIG. 4 is a cross sectional view taken along line 4—4 of FIG. 3.

DESCRIPTION OF THE PREFERRED EMBODIMENT

Figure 1:
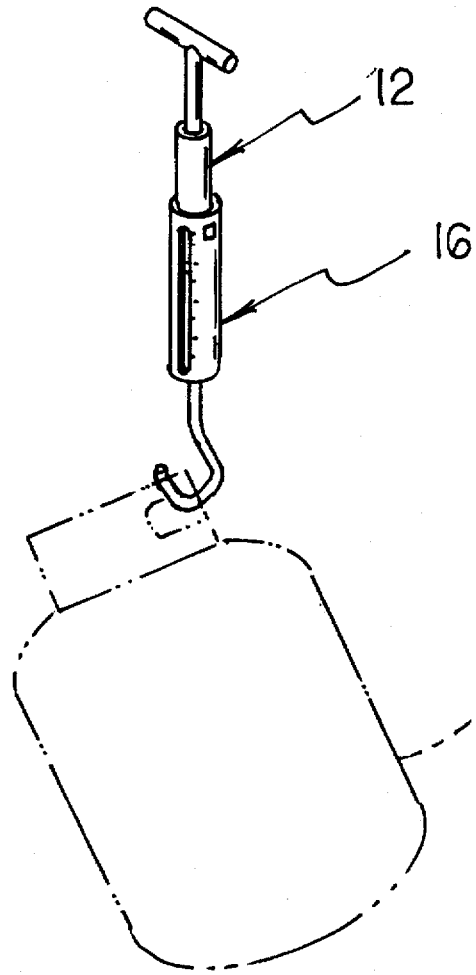
FIG. 1 is an isometric illustration of a tare compensating tank weighing device according to the present invention in use.

With reference now to the drawings, and in particular to FIGS. 1–5 thereof, a new tare compensating tank weighing device embodying the principles and concepts of the present invention and generally designated by the reference numeral 10 will be described.

More specifically, it will be noted that the tare compensating tank weighing device 10 comprises a weight indicating means 12 for suspending a container 14, such as a propane tank or the like, and for indicating a gross weight thereof. A calibration means 16 is mounted to the weight indicating means 12 for calibrating an output of the weight indicating means 12 so as to convert the gross weight indicated into a net weight of the contents of the container 14 by compensating for the empty weight of the container 14. By this structure, a known empty weight of the container 14 can be entered into the calibration means 16, whereby a weight indicated volume can be read from the weight indicating means 12 to indicate an amount of the contents within the container 14.

Figure 2:
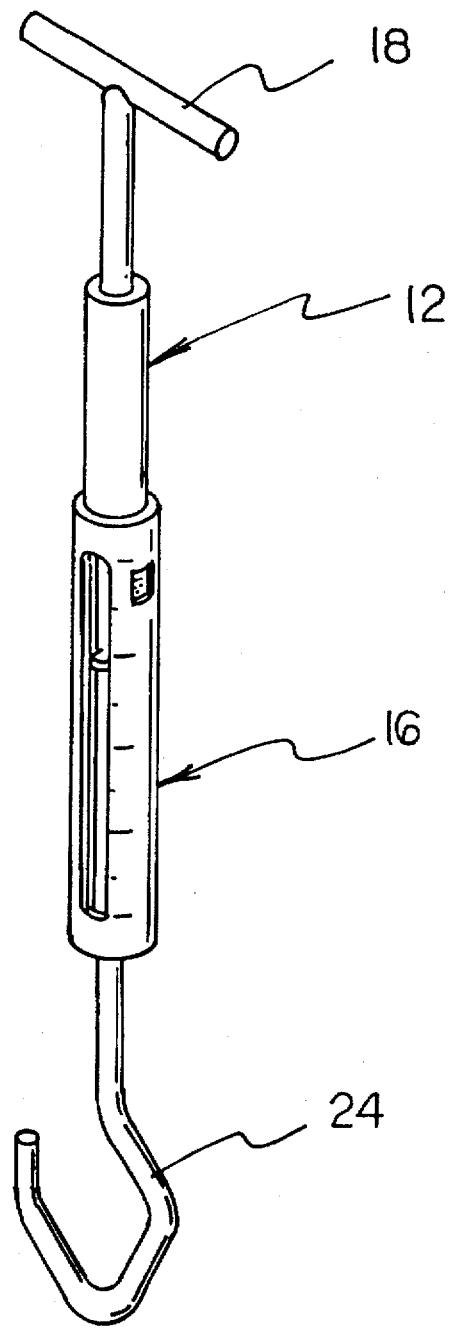
FIG. 2 is an isometric illustration of the invention, per se.

As best illustrated in FIGS. 2 through 4, it can be shown that the weight indicating means 12 according to the present invention 10 comprises a handle 18 for being grasped and manipulated by an individual during use of the device 10. An elongated body 20 depends from the handle 18 and is constructed so as to be substantially hollow in configuration. As shown in FIG. 4, the elongated body 20 is closed at a lower end thereof and includes a through-extending aperture permitting telescoping extension of a telescoping rod 22 into the elongated body through the closed lower end thereof. The telescoping rod 22 terminates at a lower distal end thereof in a hook 24 suitable for engaging a portion of the container 1 or propane tank as illustrated in FIG. 1 of the drawings. A pointer 26 is coupled to an inner proximal end of the telescoping rod 22 within the elongated body 20 and projects exteriorly of the elongated body 20 through an elongated aperture extending longitudinally through the elongated body. A spring 28 is interposed between the pointer 26 and the closed lower end of the elongated body 20 so as to resist an extension of the telescoping rod 22 therefrom. By this structure, a suspension or hanging of a container 14 from the hook 24 will cause extension of the telescoping rod 22 from the closed lower end of the elongated body 20 so as to move the pointer 26 within the elongated aperture in accordance with a gross weight of the container.

Figure 5:
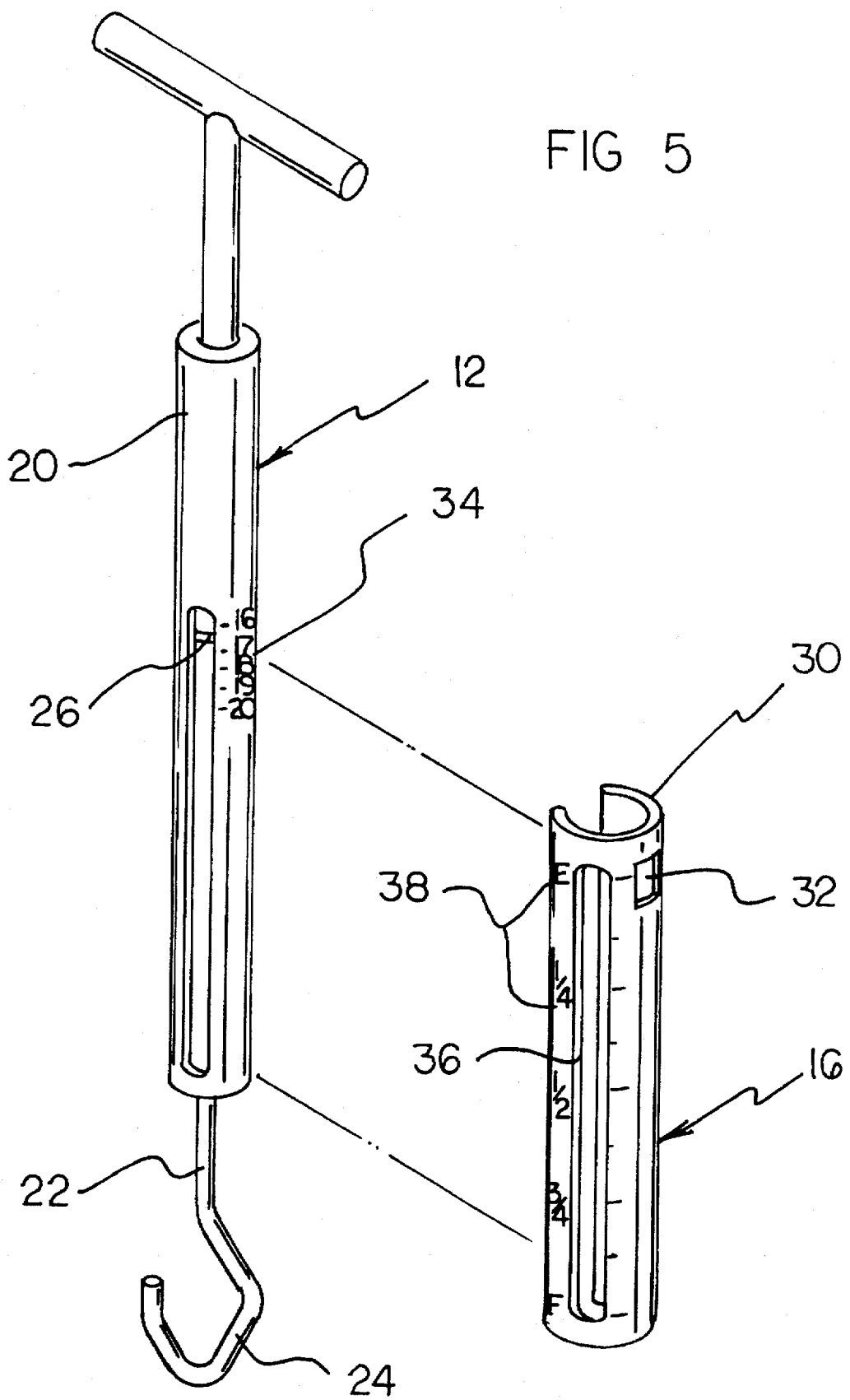
FIG. 5 is an exploded isometric illustration of the invention.

As best illustrated in FIGS. 3 through 5, it can be shown that the calibration means 16 according to the present invention 10 preferably comprises a semi-cylindrical sleeve 30 removably positionable concentrically about the elongated body 20 of the weight indicating means 12. To this end, the semi-cylindrical sleeve 30 is constructed of a substantially resilient material permitting lateral positioning over the elongated body 20 as illustrated in FIG. 5 of the drawings. Subsequent to such positioning of the semi-cylindrical sleeve 30 over the elongated body 20, a resilient contraction of the semi-cylindrical sleeve 30 will create a frictional engagement between an interior of the semi-cylindrical sleeve and an exterior of the elongated body 20 so as to retain the calibration means 16 in a desired orientation relative thereto.

With continuing reference to FIG. 5, it can be shown that the semi-cylindrical sleeve 30 is shaped so as to define a tare aperture 32 directed therethrough which can be selectively aligned with tare indicia 34 printed upon an exterior of the elongated body 20. Further, the semi-cylindrical sleeve 30 is shaped so as to define a gauge aperture 36 extending therealong substantially corresponding to a shape of the elongated aperture directed through the elongated body 20. Level indicia 38 is marked along the semi-cylindrical sleeve 30 proximal to the gauge aperture 36 directed therethrough so as to indicate approximate volume of liquid contained within the container 14 in accordance with the weight thereof in a manner which will subsequently be described in more detail. To this end, the level indica 38 includes markings indicating levels within the container ranging from full to empty, preferably in quarter increments thereof. By this structure, the tare aperture 32 of the calibration means 16 can be selectively aligned with an appropriate tare indicia 34 corresponding to an empty weight of the container 14 such that an accurate or net weight of the contents within the container 14 are indicated by the level indica 38 during weighing of the container with the present invention 10. In other words, an individual utilizing the device 10 can simply align the tare aperture 32 with the tare indica 34 corresponding to an empty weight of the container 14, hang the container 14 from the hook 24 of the weight indicating means 12, and subsequently read or ascertain a level of fluid within the container 14 as indicated by the relative positioning of the pointer 26 and the level indica 38. Thus, the present invention 10 allows a single tare compensating tank weighing device 10 to be utilized in the measuring of containers 14 having various empty weights.

In use, the tare compensating tank weighing device 10 according to the present invention can be easily utilized to accurately ascertain a volume of liquid contained therewithin in accordance with a net weight of the contents of the container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tare compensating tank weighing device comprising:
    a weight indicating means for indicating a gross weight of a container, said weight indicating means including an elongated body; and
    a calibration means for calibrating an output of the weight indicating means so as to convert the gross weight indicated into a net weight of the contents of the container by compensating for the empty weight of the containers.
    wherein the calibration means comprises tare indicating indicia printed upon an exterior of the elongated body; and a semi-cylindrical sleeve removably positioned concentrically about the elongated body of the weight indicating means, the semi-cylindrical sleeve being shaped so as to define a tare aperture directed therethrough which can be selectively aligned with the tare indicia printed upon an exterior of the elongated body, the semi-cylindrical sleeve further being shaped so as to define a gauge aperture extending therealong substantially corresponding to a shape of the elongated aperture directed through the elongated body; level indicia marked along the semi-cylindrical sleeve proximal to the gauge aperture directed therethrough so as to indicate a volume of liquid contained within the container.

2. A tare compensating tank weighing device comprising:
    a weight indicating means for indicating a gross weight of a container;
    a calibration means for calibrating an output of the weight indicating means so as to convert the gross weight indicated into a net weight of the contents of the container by compensating for the empty weight of the container;
    wherein the weight indicating means comprises a handle means for being grasped and manipulated by an individual during use of the device; an elongated body depending from the handle and being substantially hollow in configuration, the elongated body having an elongated aperture extending longitudinally therethrough; a telescoping rod extending into the elongated body through a lower end thereof, the telescoping rod being shaped so as to define a hook at a lower distal end thereof; a pointer coupled to an inner proximal end of the telescoping rod within the elongated body; and a spring interposed between the pointer and the lower end of the elongated body so as to resist an extension of the telescoping rod therefrom; and
    wherein the calibration means comprises tare indicating indicia printed upon an exterior of the elongated body; and a semi-cylindrical sleeve removably positioned concentrically about the elongated body of the weight indicating means, the semi-cylindrical sleeve being shaped so as to define a tare aperture directed therethrough which can be selectively aligned with the tare indicia printed upon an exterior of the elongated body, the semi-cylindrical sleeve further being shaped so as to define a gauge aperture extending therealong substantially corresponding to a shape of the elongated aperture directed through the elongated body; level indicia marked along the semi-cylindrical sleeve proximal to the gauge aperture directed therethrough so as to indicate a volume of liquid contained within the container.

3. The tare compensating tank weighing device of claim 2, wherein the semi-cylindrical sleeve is constructed of a substantially resilient material permitting outward deformation thereof and lateral positioning over the elongated body.

* * * * *